July 15, 1941.   E. O. THOMPSON   2,249,717
IMPULSE SENDING DEVICE
Filed July 20, 1938   3 Sheets-Sheet 1
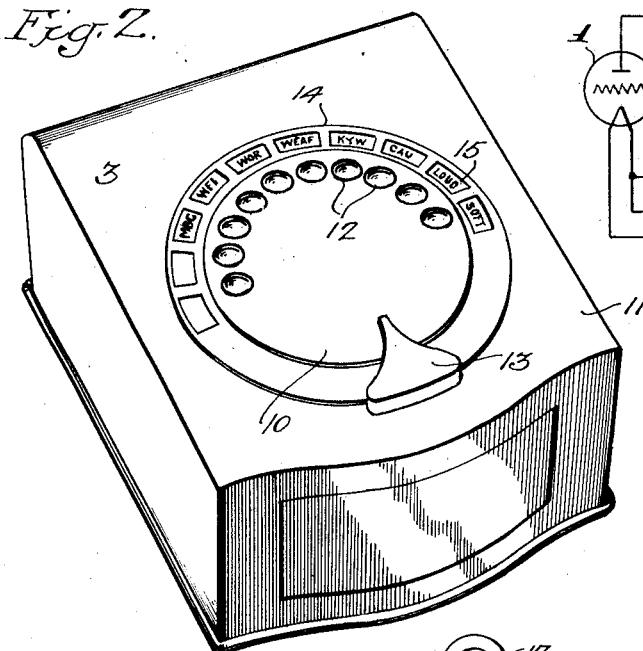
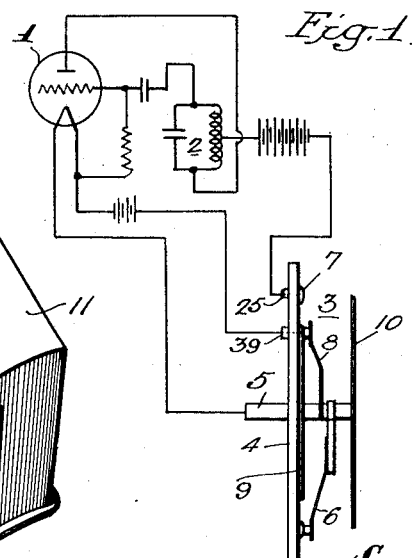
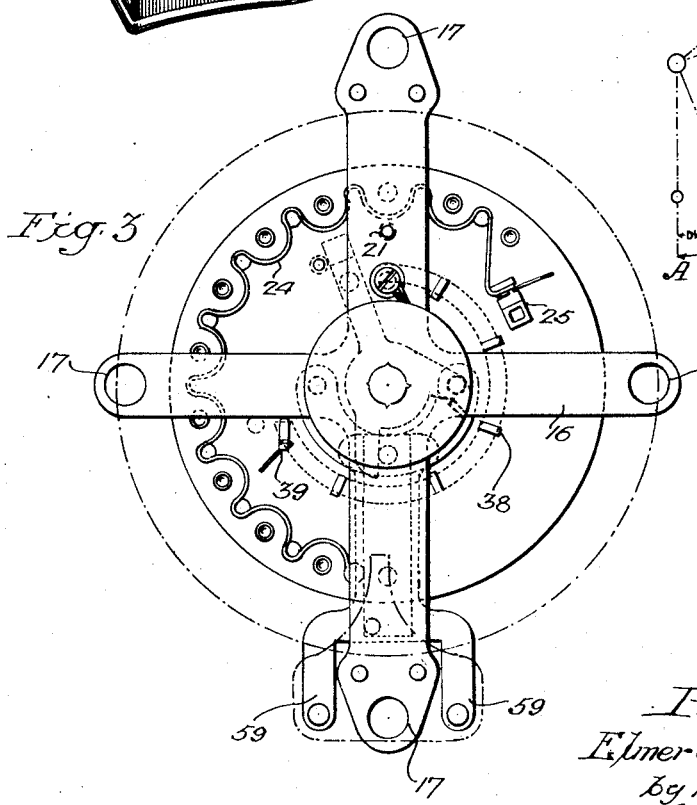
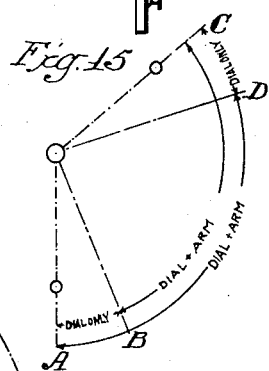
Inventor:
Elmer O. Thompson
by his Attorneys
Howson & Howson

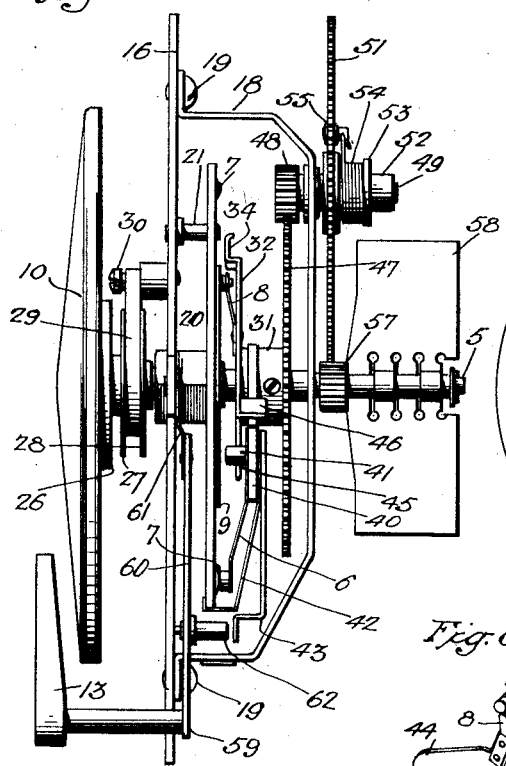
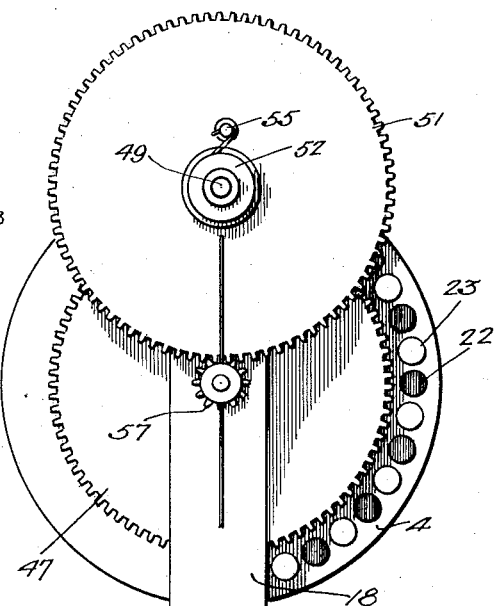
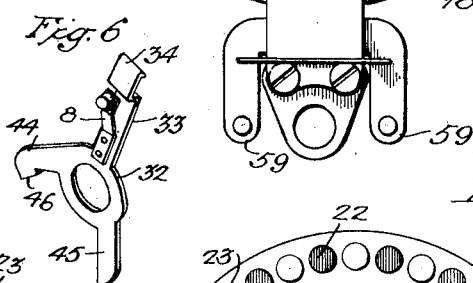
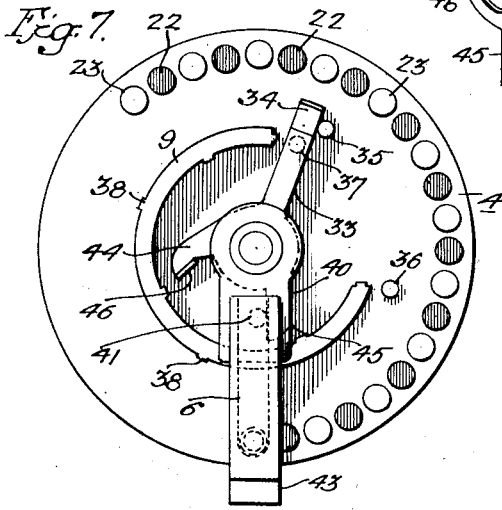
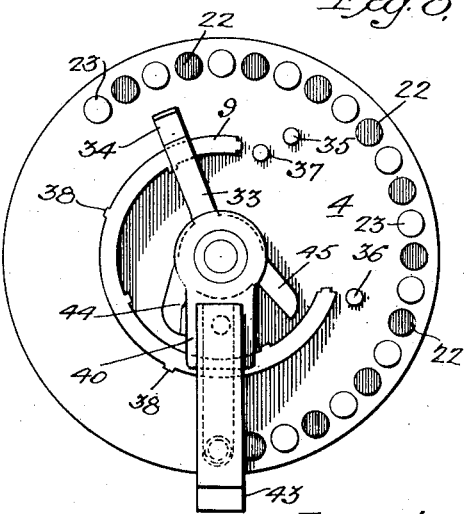

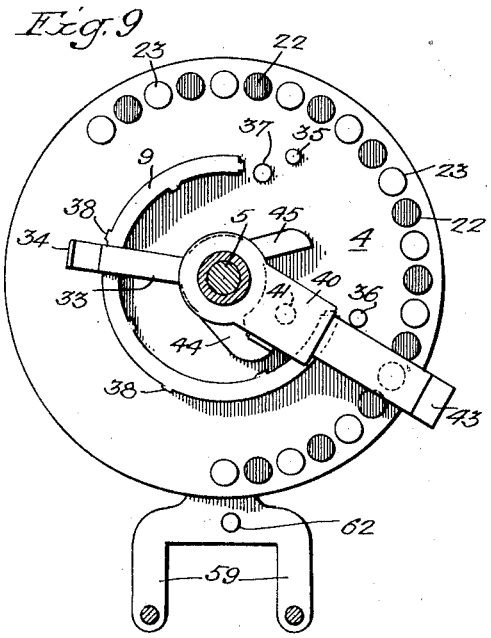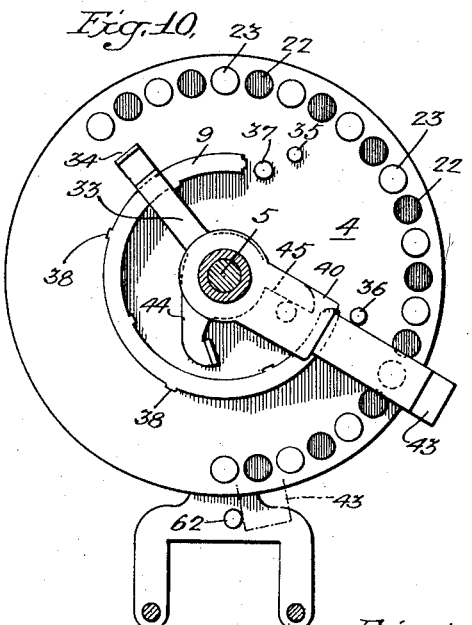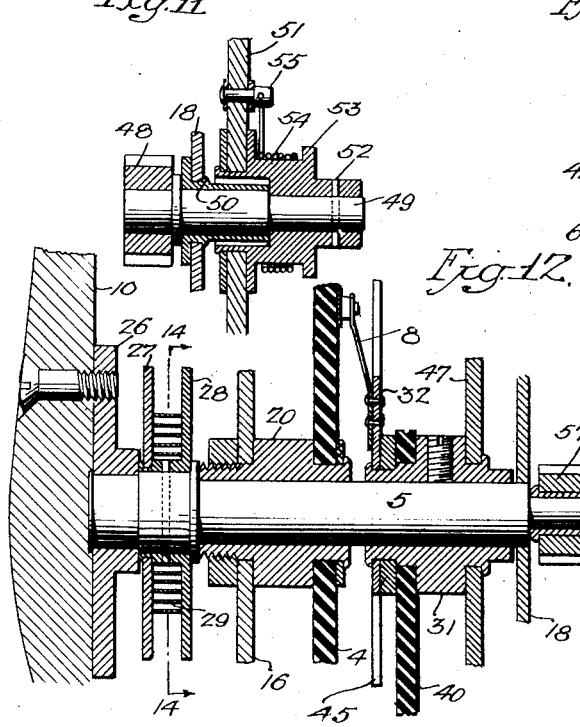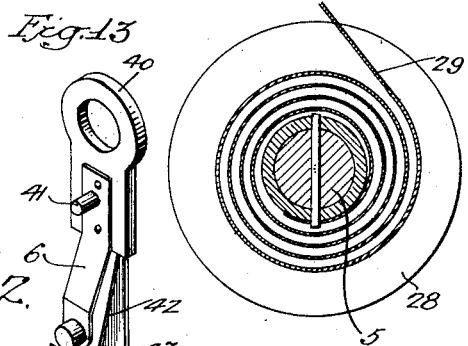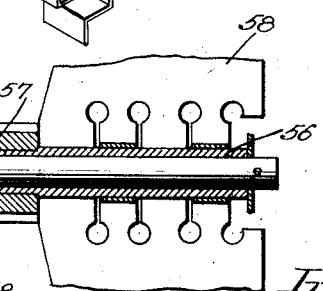

Patented July 15, 1941

2,249,717

UNITED STATES PATENT OFFICE 2,249,717

IMPULSE SENDING DEVICE

Elmer O. Thompson, Grasmere, N. Y., assignor, by mesne assignments, to Philco Radio and Television Corporation, Philadelphia, Pa., a corporation of Delaware Application July 20, 1938, Serial No. 220,368

12 Claims. (Cl. 177—380)

This invention relates to electrical circuit-controlling and impulse-sending devices, and more particularly, to a novel impulse-sending device for controlling an impulse-generator by means of which the impulse-generator may be conditioned for proper operation before the generation of impulses commences, and other novel results may be obtained. The present invention is in the nature of an improvement over that disclosed in the co-pending application of Elmer O. Thompson, Serial No. 220,367, filed July 20, 1938.

The invention is capable of general application, but it is particularly applicable to a remote control system of the type disclosed and claimed in the co-pending application of Milton L. Thompson, Serial No. 220,356, filed July 20, 1938. wherein control signals are utilized to control the operation of a radio receiver.

The principal object of the present invention is to provide a simple device which may be manufactured economically and which is adapted to perform its several functions in a highly efficient manner.

A more specific object of the invention is to provide an impulse-sending device embodying novel means for delaying the sending of impulses for a time interval sufficient to permit the impulse-generator to become conditioned properly for operation.

Another object of the invention is to provide an impulse-sending device which is adapted to initiate the conditioning of the impulse-generator and which embodies novel means for permitting the generator to become properly conditioned prior to the sending of impulses thereto.

A further object of the invention is to provide a device of this character embodying manually-controllable means for varying the time duration of an impulse at the will of an operator.

A still further object of the invention is to provide a device of this character embodying a speed governor and novel means for effecting decoupling of the governor during manual manipulation, thereby facilitating operation of the device.

Other objects and features of the invention will be apparent hereinafter.

In the accompanying drawings:

Fig. 1 is a diagrammatic illustration of an impulse-generator embodying the invention;

Fig. 2 is a perspective view of the impulse-sending device;

Fig. 3 is a face view of the mechanism removed from the casing or housing;

Fig. 4 is a side elevational view of the mechanism;

Fig. 5 is a rear face view of the same;

Fig. 6 is a perspective view of one of the contact-carrying elements;

Figs. 7 to 10 are face views of the contact-carrying disk and associated movable contact members showing the latter at different stages of operation of the device;

Fig. 11 is a detail section taken axially through the decoupling means or clutch for the governor;

Fig. 12 is a detail section taken axially of the main shaft of the device;

Fig. 13 is a perspective view of a contact-carrying element;

Fig. 14 is a detail sectional view taken along line 14—14 of Fig. 12; and

Fig. 15 is a graphic illustration of the operation of the device.

Referring to Fig. 1, there is shown an impulse-generator in the form of a simple oscillator circuit comprising the vacuum tube 1 and associated tuned circuit 2. The operation of such an oscillator is well understood and need not be described. In the present instance, the energizing circuit for the filament or cathode of tube 1 and the plate circuit of the oscillator are both controlled by the device shown diagrammatically at 3. This device comprises a contact-carrying disk 4, a rotatable shaft 5, a contact member or arm 6 carried by the shaft and arranged to successively engage arcuately-spaced contacts 7 on disk 4, a second contact arm 8 carried by the shaft and adapted to engage an arcuate contact 9 on disk 4, and a manually-operable member 10 in the form of a finger dial for rotating the shaft 5 to different angular positions under the influence of a spring to thereby cause the contact arm 6 to successively engage the contacts 7, thus intermittently closing the plate circuit of the oscillator and causing the generation of a selected number of impulses. It will be noted that the filament circuit of the oscillator tube is completed through the contacts 8 and 9 so that the tube is energized when the dial is actuated. In order to permit the filament of the tube to heat to its proper operating temperature, the impulse-sending movement of contact arm 6 is delayed for a time interval after the dial is released, by means of novel means to be described later. It will be noted also that the shaft 5 serves as a current-conducting element which is common to the plate and filament circuits.

In Fig. 2, there is illustrated the preferred physical form of the impulse-sending device, This device comprises a casing or housing 11 within which the mechanism is contained and, in cooperative association with one of the faces of the casing, there is provided the rotatable finger dial 10 generally similar to the dials employed in telephone systems and having finger recesses 12. Associated with the dial is a stationary finger stop 13. Adjacent the dial is a stationary indicia holder or ring 14 carrying indicia members or plates 15 on which there are indicated the call letters of certain radio broadcasting stations. The call letters of each station correspond to a finger opening or recess in the dial and, in the normal rest position of the dial, each indicia plate is disposed opposite its corresponding finger recess. In operation, the finger recess corresponding to a desired broadcasting station is selected and the dial is rotated clockwise in the manner of an ordinary telephone dial. This effects the generation of a certain number of control impulses which may be employed to control the operation of a remotely-located radio receiver as disclosed in the above-mentioned co-pending application of Milton L. Thompson. It will be understood, of course, that the device is not limited to the control of a radio receiver, but may be employed to send impulses for any other purpose. For example, it might be employed to control remotely a plurality of electrical circuits, in which case, suitable indicia would be provided on the impulse-sending device.

Considering now the detailed structure of the device 3 and referring to the other views of the drawings, the cruciform piece 16 serves as a mounting element for the parts and to this end the extending arms of this piece are provided with holes 17 for attachment within the casing. A U-shaped strap 18 has its ends secured to two opposite arms of piece 16, as shown at 19. The cruciform piece 16 and the strap 18, together constitute a frame for the other parts of the device, the frame being rigidly secured to the housing and remaining stationary.

The disk 4 above-mentioned, which is formed of insulating material, is fixedly secured to the cruciform piece 16 by means of the bearing member 20 (see Fig. 12). A pin 21 (Fig. 4) affixed to an arm of the piece 16 extends into an opening or recess in disk 4 to anchor the disk in a positive manner against rotation. The contact buttons designated generally at 7 in Figs. 1 and 4 are circularly arranged near the edge of the disk and protrude from the rear face of the disk, as shown in Figs. 7 to 10. Alternate ones of these buttons constitute "dead" contacts, while the remaining alternate buttons constitute "live" contacts. The "live" contacts 22 are shaded to distinguish them from the "dead" contacts 23. It will be noted that the end buttons are both "dead" contacts. As may be seen in Fig. 3, the live contacts are connected together at the rear of disk 4 by means of a conductor 24 which is connected to a terminal lug 25. The purpose of this construction will be apparent later.

The rotatable shaft 5 extends through the cruciform piece 16 and through the strap 18 and is rotatably supported by the bearing 20 and strap 18. At its front end, this shaft carries a plate 26 to which the finger dial 10 is attached. Adjacent plate 26, there are mounted on the shaft two spaced disks 27 and 28 (Fig. 12) which serve to retain a spiral spring 29, the inner end of which is fastened to the shaft (Fig. 14) while the outer end of the spring is secured to a pin 30 carried by piece 16 (Fig. 4). The spring is arranged so that it tends to rotate the shaft counterclockwise, as viewed from the front of the device. Therefore, when the dial 10 is rotated from its rest position in a clockwise direction until the operator's finger strikes the finger stop 13 and is then released, it is rotated counterclockwise back to its rest position by the spring 29.

A collar 31 (Fig. 12) is secured to shaft 5. On this collar, there is secured a three armed metallic member 32 (Fig. 6), the arm 33 of which has an end portion 34 formed to constitute a movable stop element which cooperates with the stationary stop pins 35 and 36 mounted on disk 4. The arm 33 also carries the resilient contact strip 8 having a contact button on the end thereof which normally engages a "dead" button 37 on the rear face of disk 4, but which rides over the arcuate contact strip 9 when the shaft 5 is rotated, as mentioned above in connection with Fig. 1. The contact strip 9 is secured to disk 4 by means of integral lugs 38 on the strip which are inserted through openings in the disk 4 and bent over to thus anchor the strip in place. The end lug 39 (Fig. 3) has an extension serving as a terminal to which electrical connection may be made. It will be seen, therefore, that the button 37 serves only as a rest for the contact 8 when the device is in its rest position.

Loosely mounted on collar 31 is an insulating piece 40 (Figs. 12 and 13), to the front face of which there is secured the resilient contact arm 6 which is adapted to ride over the buttons 7, as above mentioned. A pin 41 projects from the resilient contact arm 6. To the rear face of member 40 there are attached arms 42 and 43. The arm 42 is resilient and has its end bent over the edge of disk 4 to serve as a supporting guide and to impose a frictional drag on member 40. The purpose of arm 43 will appear later. The member 40 and the metallic pin 41 carried thereby are engageable, respectively, by the arms 44 and 45 of the contact member 32. It will be noted that the arm has a turned end portion 46 which projects transversely of the plane of the insulating member 40 (Fig. 4) and engages the edge of this member to rotate it and the contact arm 6 carried thereby when the finger dial 10 is manually rotated. When the dial is released, the contact member 32 rotates in the opposite direction, and when the arm 45 engages pin 41 (Fig. 4), the contact arm 6 is rotated to effect engagement thereof with the successive contact buttons 7. Due to the spacing between the arms 44 and 45, there will be a time delay after the release of the finger dial before the contact arm 45 engages pin 41, thereby permitting the proper conditioning of tube 1 before the sending of impulses commences. More will be said of this later.

A gear 47 carried by collar 31 (Fig. 12) meshes with a small pinion 48 on a rotatable stud 49 which is journaled in bearing 50 carried by strap 18 (Fig. 11). A gear 51 is loosely carried by member 52 which is mounted on shaft 49. On the small drum 53 forming a part of member 52, there is tensioned a fine wire spring 54. One end of the spring is affixed to a pin 55 on gear 51, while the other end frictionally engages the drum 53. The spring is so wound that the shaft 5 may be rotated clockwise, to thus rotate stud 49 counterclockwise, without rotating the gear 51 but, when the shaft 5 rotates counterclockwise, rotating the stud 49 clockwise, the spring 54 effects a friction clutching engagement between gear 51 and stud 49.

On the rearwardly-extending diminished end of shaft 5, there is rotatably mounted a sleeve 56 (Fig. 12) which carries a small pinion 57 meshing with gear 51. The sleeve 56 also carries a speed governor member in the form of a butterfly element 58. Since the clutch 52, 53 effects a friction connection between stud 49 and gear 51 during the return movement of the parts, the governor member 58 is operated during such movement, but the clutch permits manual operation of the device during the selecting operation without causing rotation of the governor member.

The finger stop 13 is attached to the extending ends 59 of a radially-extending arm 60 which is carried by a resilient yoke 61 (Fig. 4) attached to the cruciform piece 16. The resilient yoke 61 maintains the finger piece 13 in its outermost position, but permits depressing of the finger piece to thus depress the arm 60. A pin 62, carried by arm 60, is thereby depressed, the pin 62 moving into the path of the arm 43. The pin 62 is so arranged that it stops the contact arm 6 when the contact arm is in engagement with a "live" contact button, of which more will be said later. As mentioned above, the purpose of this is to enable the sending of an impulse of relatively long duration.

The filament or heater circuit of the oscillator tube 1 is included in an energizing circuit comprising the arcuate contact 9 and the contact arm 8. This circuit is traced through the terminal 39, the contact 9, the contact arm 8, contact member 32 and through shaft 5 to the frame of the device which serves as a return or ground conductor.

The plate circuit of the oscillator is controlled by the rotating contact arm 6. This circuit may be traced from the terminal 25 through the conductor 24 to the "live" contact buttons and through the contact arm 6 to pin 41. When the pin 41 is not engaged by arm 45, the circuit is open, but when these two elements are engaged, the circuit is completed through contact member 32 to the shaft 5 and thence to the frame constituting the return conductor.

Considering the operation of the device, normally the movable stop 34 is in engagement with the stationary stop 35, as shown in Fig. 7, thus fixing the rest position of the parts. At this time, the contact arm 8 is in engagement with the rest button 37, and, therefore, the filament or heater circuit of the oscillator tube is open. The contact arm 6 is in engagement with the first "dead" button 23, and, therefore, the plate circuit of the oscillator is open. The arm 45 is in engagement with pin 41.

When it is desired to generate a certain number of impulses corresponding to a particular station indicated in Fig. 2, the finger dial 10 is actuated in the manner of a conventional telephone dial. The clockwise rotation of the dial causes contact arm 8 to ride onto the arcuate contact 9, as shown in Fig. 8, thus immediately energizing the filament or heater circuit of the oscillator. At the same time, the arm 45 disengages itself from pin 41. When the lug 46 on arm 44 engages the edge of the insulating member 40, the contact arm 6 is rotated, causing it to ride over the successive buttons 8, but no impulses are generated, since the plate circuit of the oscillator is open, owing to the fact that the arm 45 is out of engagement with pin 41.

When the dial is released after the parts have been moved to some position such as shown in Fig. 9, the dial is automatically returned to its rest position by the spring 29, causing the contact member 32 to rotate in the opposite direction. At this time, the insulating member 40 and the contact arm 6 remain stationary but, when the arm 45 engages pin 41, as shown in Fig. 10, the plate circuit of the oscillator is closed at that point and the arm 6 is rotated over the contact buttons, thus intermittently closing and opening the plate circuit of the oscillator to generate the desired number of impulses. The parts are thus returned to their normal rest positions. It will be noted that the oscillator plate circuit is not completed until after the time delay occasioned by the spacing of arms 44 and 45. This time delay insures that the cathode of the oscillator will be heated to its operating temperature before the plate circuit is first completed.

The delay action of the device is depicted graphically in Fig. 15, showing angular movements of the dial and contact arm 6 during a complete cycle of operation. The angular position A in Fig. 15 represents the rest position of the parts. When the dial is operated, as above described, the dial moves through the arc A—B before the lug 46 engages the edge of insulating member 40 and then the rotating member 32 moves the contact arm 6 so that both the dial and the contact arm move through the arc B—C, the position represented by C being an arbitrary position assumed to have been selected by the selection of one of the recesses or apertures in the dial.

During the initial return movement, the dial moves through the arc C—D before the arm 45 engages the pin 41. The rotating member 32 then moves the contact arm 6 so that both the dial and the arm rotate through the arc D—A back to the rest position.

Thus, the arcs A—B and C—D, which are fixed by the spacing of arms 44 and 45, represent the lost-motion of the lost-motion connection provided by the cooperative arrangement of the said arms with the contact-carrying member 40. The lost-motion or time delay A—B serves to permit the arm 45 to disengage itself from pin 41 during the manual rotation of the contact arm 6 so that the plate circuit of the oscillator will not be completed as the contact arm 6 rides over the contact buttons. The time delay or lost-motion C—D provides the desired time delay between the release of the dial and the commencement of the generation of the impulses.

It may now be noted that the "dead" contact buttons 23 serve an important function, namely, they permit substantial spacing of the live contact buttons 22 by providing surfaces between the live contact buttons over which the contact arm 6 may ride and prevent the contact on arm 6 from engaging the insulating disk 4 and provide metallic surfaces for the said contact. The insulating disk 5 is preferably formed of "bakelite" or similar material and, if the contact on arm 6 were permitted to come into engagement with the disk, the foreign matter, such as dirt, grease, etc. which accumulates on the surface of the disk, would decrease the efficiency of the contact. By providing a metallic track on which the contact may ride, the contact is kept clean and free of foreign material.

The rest button 37 serves substantially the same purpose with respect to the contact on arm 8.

As described above, the operator may prolong the duration of one of the impulses by depressing the finger stop 13 to bring the pin 62 into the path of movement of arm 43. Obviously, the particular impulse which may be prolonged in this manner will depend upon the position of the stop or pin 62. In the device illustrated, the arrangement is such that the contact arm 8 may be stopped by pin 62 when the contact arm is in engagement with the last live contact button during the impulse generating return movement, as indicated by the dot-and-dash position of arm 43 shown in Fig. 10. Consequently, if the finger stop 13 is depressed during any particular operation of the device, a series of successive impulses will be generated consisting of a number of short impulses followed by a relatively long impulse. The number of short impulses will depend, of course, upon the particular recess or aperture of the dial selected.

In the device illustrated, there are eleven live contact buttons and ten recesses or apertures in the dial. The first recess of the dial is effective to generate two impulses, the second recess is effective to generate three impulses, etc. Thus, the number of impulses that may be generated ranged from two to eleven. The last impulse sent in any instance may be a short impulse or it may be a relatively long impulse depending upon whether or not the finger rest 13 is depressed.

While the present invention is concerned with the structure by which a relatively long impulse may be generated at will, and is not concerned with the specific purpose of the long impulse, it may be mentioned that the above-mentioned co-pending application of Milton L. Thompson utilizes the long impulse for remote control of the volume of the radio receiver being controlled by the device. In such case, the first two recesses or apertures of the dial are reserved for remote control of the volume, one effecting a volume increase while the other effects a volume decrease. By using the first two dial recesses in conjunction with the depressible finger stop, the operator is enabled to generate a single short pulse followed by a long pulse, or two short pulses followed by a long pulse. In the said Thompson application, the short pulses thus generated determine the direction of operation of a volume control motor, while the duration of the long pulse determines the amount that the volume control is operated either to increase the volume or decrease it. It will be understood, therefore, that the present device may be employed for this or any other purpose to which it may be adapted.

In operating the device to generate a long impulse, the operator may employ the index finger to dial the impulses and he may employ the thumb of the same hand to depress the finger stop 13. It will be noted that the finger stop is of substantial width so that this mode of operation is readily possible. Furthermore, the design of the finger stop is such that the operator may employ either the right hand or the left hand to operate the device. Thus, the device may be operated by a left-handed person with substantially the same facility that it is operated by a right-handed person.

In dialing the impulses, the natural tendency is for the operator to insert a finger in the selected recess or opening of the dial and then move the dial with a snap action until the inserted finger strikes the finger stop. If substantial effort were required to actuate the parts, the operator may be apt to bruise his finger against the finger stop due to the fact that he would be applying a substantial amount of pressure. The decoupling feature of the device prevents this and greatly facilitates the operation of the device. The dial may be moved with very little applied pressure since the one-way clutch above described decouples the governor 58 from the driving parts. Since the resistance of the governor is responsible for most of the resistance to movement of the dial, the decoupling of the governor reduces the resistance to a minimum. At the same time, the clutch couples the governor to the driving parts as soon as the return portion of the operating cycle commences.

Thus, it will be seen that the device embodies several novel features which render it highly efficient in the performance of its several functions. Moreover, considering the various functions which the device performs, it will be apparent that the structure is extremely simple. It will be understood, of course, that the invention is not limited to the specific structure illustrated and that various other embodiments and modifications are possible within the scope of the appended claims.

I claim:

1. In a circuit controlling device, a plurality of spaced stationary contacts permanently connected together, a movable contact member normally out of engagement with said contacts and arranged to successively engage said contacts, means including an energy storing element for normally maintaining said member in a rest position and for operating said member to said position whenever it is moved therefrom, manually operable means for moving said member from said position and for simultaneously storing energy in said element, to thereby cause said member to successively engage said contacts under the influence of said element after release of said manual means, means for preventing closure of the circuit including said contacts during the manual movement of said member, additional contacts operable by said manual means before the release thereof, to effect a circuit-closing function, and means for delaying the return movement of said contact member for a time interval after the release of said manual means.

2. In a circuit controlling device, a plurality of spaced arcuately arranged stationary contacts permanently connected together, a rotatable shaft, a movable contact member carried by said shaft normally out of engagement with said contacts and arranged to successively engage said contacts, additional contact means operable by said shaft upon rotation thereof, to thereby effect a circuit-closing function, means including a spring for normally maintaining said shaft in a rest position and for rotating said shaft to said position whenever it is moved therefrom, manually operable means for rotating said shaft from said position and for simultaneously storing energy in said spring, to thereby cause said member to successively engage said contacts under the influence of said spring after release of said manual means, means for preventing closure of the circuit including said spaced contacts during the manual movement of said shaft, and means comprising a lost-motion connection between said shaft and said member for delaying the return movement of said member for a time interval after the release of said manual means.

3. In a circuit controlling device, a plurality of spaced arcuately arranged stationary contacts permanently connected together, a rotatable shaft, a contact member loosely carried by said shaft and additional contact means operable by said shaft upon the rotation thereof, to effect a circuit-closing function, arranged to successively engage said contacts, additional contact means operable by said shaft to effect a circuit-closing function, means including a spring for normally maintaining said shaft in a rest position and for rotating said shaft to said position whenever it is moved therefrom, manually operable means for rotating said shaft from said position and for simultaneously storing energy in said spring, and an actuating member on said shaft having angularly spaced portions adapted respectively to engage said contact member during the respective opposite movements of said shaft, thus effecting a time delay in the return movement of the contact member, one of said portions being adapted to complete a circuit by engagement with said contact member only during the return movement of said member.

4. In a circuit controlling device, a plurality of spaced arcuately arranged stationary contacts permanently connected together, a rotatable shaft, an insulating member loosely carried by said shaft, a contact element carried by said member normally out of engagement with said contacts and arranged to successively engage said contacts, additional contact means operable by said shaft upon rotation thereof, to thereby effect a circuit-closing function, means including a spring for normally maintaining said shaft in a rest position and for rotating said shaft to said position whenever it is moved therefrom, manually operable means for rotating said shaft from said position and for simultaneously storing energy in said spring, and an actuating member conductively connected to said shaft having a pair of spaced portions adapted respectively to engage said insulating member and said contact element during the respective opposite movements of said shaft, to thereby effect movement of said contact element over said contacts while maintaining open an electrical circuit from said shaft to said contacts during the rotation of said insulating member by manual operation of said shaft and closing said circuit during rotation of said insulating member by return movement of the shaft.

5. In a circuit-controlling and impulse-sending device, a plurality of spaced arcuately-arranged stationary contacts permanently connected together, a stationary arcuate contact, a rotatable shaft disposed axially of said contacts, a movable contact member carried by said shaft normally out of engagement with said first-mentioned contacts and arranged to successively engage said first-mentioned contacts to send a series of impulses, a second movable contact member carried by said shaft and arranged to engage said arcuate contact during rotation of said shaft, to thereby effect a circuit-closing function, means including a spring for normally maintaining said shaft in a rest position and for rotating said shaft to said position whenever it is moved therefrom, manually-operable means for rotating said shaft from said position and for simultaneously storing energy in said spring, to thereby cause said first contact member to successively engage said first-mentioned contacts under the influence of said spring after release of said manual means, means for preventing closure of the circuit including said spaced contacts during the manual movement of said shaft, and means for delaying the return movement of said first contact member for a time interval after the release of said manual means.

6. In a circuit-controlling device, a plurality of spaced arcuately arranged stationary contacts bonded together in an electric circuit, contacts interposed between said first contacts, a rotatable shaft, a movable contact member normally engaging one of said second contacts and adapted to alternately engage one of said first contacts and one of said second contacts, means including said shaft for actuating said contact member, means including a spring for normally maintaining said shaft in a rest position and for rotating said shaft to said position whenever it is moved therefrom, additional contact means operable by said shaft upon rotation thereof, to thereby effect a circuit-closing function, manually operable means for rotating said shaft from said position and for simultaneously storing energy in said spring, to thereby cause said member to engage said first and second contacts successively and alternately after the release of said manual means, means for preventing closure of the circuit including said first contacts during the manual movement of said shaft, and means for delaying the return movement of said contact member for a time interval after the release of said manual means.

7. In a circuit-controlling device, a plurality of spaced arcuately arranged stationary contacts permanently connected together, a rotatable shaft, a movable contact member carried by said shaft normally out of engagement with said contacts and arranged to successively engage said contacts, means including a spring for normally maintaining said shaft in a rest position and for rotating said shaft to said position whenever it is moved therefrom, manually operable means including a finger stop for rotating said shaft from said position through a selected angle to a predetermined position determined by the finger stop and for simultaneously storing energy in said spring, to thereby cause said member to successively engage said contacts under the influence of said spring after release of said manual means, means for preventing closure of the circuit including said spaced contacts during the manual movement of said shaft, and means operative when said finger stop is depressed to interrupt the return rotation of said shaft when said contact member is in engagement with one of said contacts.

8. In a circuit-controlling device, a plurality of groups of spaced arcuately arranged stationary contacts, the contacts of one group being permanently connected together, a rotatable shaft, an insulating member loosely carried by said shaft, a contact element carried by said member normally out of engagement with said contacts and arranged to successively engage the contacts of said one group, a projection on said contact element, means including a spring for normally maintaining said shaft in a rest position and for rotating said shaft to said position whenever it is moved therefrom, manually operable means for rotating said shaft from said position and for simultaneously storing energy in said spring, an actuating member on said shaft having three spaced portions, two of which are adapted respectively to engage said insulating member and said projection during the respective opposite movements of said shaft to thereby effect movement of said contact element over said one group of contacts and to delay the return movement of said element after release of said manual means, the third portion carrying a contact adapted to engage a second group of said contacts upon rotation of said shaft, and means for preventing closure of the circuit including said one group of contacts during the manual movement of said shaft.

9. In a signal generating device, signal generating means, an impulse sender, contacts on said impulse sender for controlling a circuit of said generating means, a plurality of spaced stationary contacts on said impulse sender, a movable contact member on said impulse sender normally disposed in a rest position out of engagement with said spaced contacts and adapted to engage said contacts whenever it is moved from said position, said spaced contacts being connected together and serving with said contact member to control another circuit of said generating means, means for returning said contact member to rest position whenever it is moved therefrom, manually-operable means for moving said contact member from its rest position and for simultaneously closing said first-mentioned contacts to complete the first-mentioned circuit, means for preventing closure of said other circuit during manual movement of said contact member, whereby said other circuit is completed only during return movement of said contact member, and means for delaying the return movement of said contact member for a time interval following the release of said manual means.

10. In a signal generating device, signal generating means including a space discharge device having a filament circuit and a space current circuit, an impulse sender, contacts on said impulse sender for controlling said filament circuit, a plurality of spaced stationary contacts on said impulse sender, a movable contact member on said impulse sender normally disposed in a rest position out of engagement with said spaced contacts and adapted to engage said contacts whenever it is moved from said position, said spaced contacts being connected together and serving with said contact member to control said space current circuit, means for returning said contact member to rest position whenever it is moved therefrom, manually-operable means for moving said contact member from its rest position and for closing said first-mentioned contacts to complete said filament circuit, means for preventing closure of said space current circuit during manual movement of said contact member, whereby said space current circuit is completed only during return movement of said contact member, and means for delaying the return movement of said contact member for a time interval following the release of said manual means thereby permitting proper conditioning of said generating means prior to the closure of said space current circuit.

11. In a circuit controlling device, a plurality of spaced stationary contacts permanently connected together, a movable contact member normally out of engagement with said contacts and arranged to successively engage said contacts, means including an energy storing element for normally maintaining said member in a rest position and for operating said member to said position whenever it is moved therefrom, manually operable means for moving said member from said position and for simultaneously storing energy in said element, to thereby cause said member to successively engage said contacts under the influence of said element after release of said manual means, means for preventing closure of the circuit including said contacts during the manual movement of said member, additional contacts operable by said manual means to effect a circuit closing function, means for delaying the return movement of said contact member for a time interval after the release of said manual means, a governor for controlling the speed of return movement of said contact member, and a one-way clutch arranged to effect a driving connection to said governor only during the return movement of said contact member.

12. In a signal generating device, signal generating means, an impulse sender, contacts on said impulse sender for controlling a circuit of said generating means, a plurality of spaced stationary contacts on said impulse sender, a movable contact member on said impulse sender normally disposed in a rest position out of engagement with said spaced contacts and adapted to engage said contacts whenever it is moved from said position, said spaced contacts being connected together and serving with said contact member to control another circuit of said generating means, means for returning said contact member to rest position whenever it is moved therefrom, manually-operable means for moving said contact member from its rest position and for simultaneously closing said first-mentioned contacts to complete the first-mentioned circuit, means for preventing closure of said other circuit during manual movement of said contact member, whereby said other circuit is completed only during return movement of said contact member, means for delaying the return movement of said contact member for a time interval following the release of said manual means, a governor for controlling the return movement of said contact member, and a one-way clutch arranged to effect a driving connection to said governor only during the return movement of said contact member.

ELMER O. THOMPSON.